July 21, 1959

A. BEKEY 2,896,143

ELECTRIC DRIVE ASSEMBLY

Filed March 11, 1957

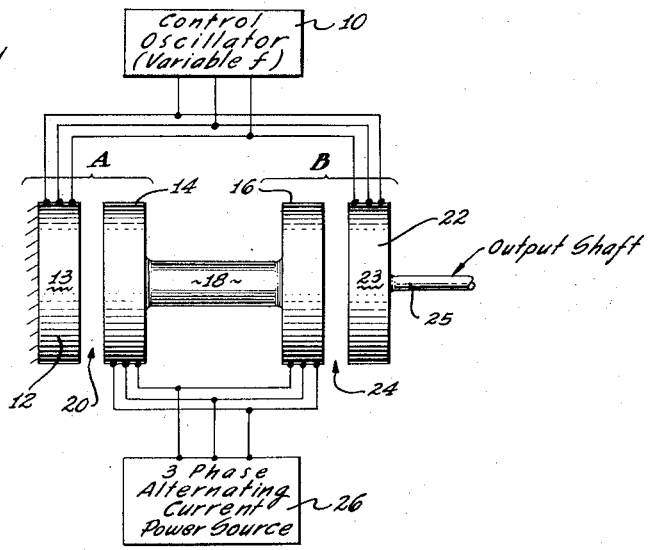

| *B is a motor **A is an Alternator | A | B | C | D | E | F |
|---|---|---|---|---|---|---|
| Control frequency cycles | 0 | 6 | 15 | 30 | 45 | 60 |
| Internal speed, machine *B rpm | 1200 | 1320 | 1500 | 1800 | 2100 | 2400 |
| Internal speed, machine **A rpm | 1200 | 1080 | 900 | 600 | 300 | 0 |
| Shaft 25, speed rpm | 0 | 240 | 600 | 1200 | 1800 | 2400 |
| Input to Portion B from 60 cycle Source 26, in HP | 1.0 | 1.0 | 1.0 | 1.0 | 1.0 | 1.0 |
| Input to Portion B at slip frequency, in HP | .0 | .1 | .25 | .5 | .75 | 1.0 |
| Total input to Portion B, in HP | 1.0 | 1.1 | 1.25 | 1.5 | 1.75 | 2.0 |
| Shaft output of Portion B, in HP | 0.0 | .2 | .50 | 1.0 | 1.5 | 2.0 |
| Mechanical transfer back to Portion A, in HP | 1.0 | .9 | .75 | .5 | .25 | 0.0 |
| Elect. output (return to the Source 26) in HP of Portion A, at line frequency | 1.0 | .8 | .5 | .0 | -.5 | -1.0 |
| Electrical output at slip frequency, in HP of Portion A. | .0 | .1 | .25 | .5 | .75 | 1.0 |

INVENTOR:
Andrew Bekey

By Smyth & Roston
Attorneys

July 21, 1959  A. BEKEY  2,896,143
ELECTRIC DRIVE ASSEMBLY
Filed March 11, 1957  3 Sheets-Sheet 2

INVENTOR:
Andrew Bekey
By Smyth & Roston
Attorneys

United States Patent Office 2,896,143
Patented July 21, 1959

2,896,143

ELECTRIC DRIVE ASSEMBLY

Andrew Bekey, Los Angeles, Calif., assignor to Genisco, Inc., Los Angeles, Calif., a corporation Application March 11, 1957, Serial No. 645,072

25 Claims. (Cl. 318—197)

The present invention relates generally to variable speed drive assemblies incorporating alternating current electrical machinery.

Problems have long existed in the alternating current motor art in providing a suitable and efficient speed control for an alternating current motor. In the prior art, the induction alternating current motor was not susceptible to an efficient speed control because of its constant speed characteristics.

A variety of different speed controls have been suggested in the past for controlling the speed of an alternating current induction motor. However, these controls for the most part suffer from one disadvantage or another. The speed of an induction motor, for example, may be changed over a small range in accordance with prior art practices by varying the voltage applied to the motor. This may be achieved by a resistance controller in the feed line of the motor. However, the rotor resistance of the motor must be high for this speed control system to be practical. This results in relatively high rotor losses and in a dropping speed torque characteristic. Other methods of speed control have also been used for these motors, but they all have one drawback or another inherent in their construction. These other methods include the use of a wound rotor with slip rings and the connection of external resistance into the rotor circuit. This latter particular method is very inefficient and the speed of the resulting assembly changes with load.

Other complicated schemes for controlling the speed of alternating current motors have been proposed which entail the use of extraneous commutator machinery. The sole function of this extraneous machinery is for speed control and to feed excess energy back to the line. It is clear that such systems are inherently wasteful of electric machinery and that they represent a most uneconomical means for controlling the speed of a motor.

The present invention provides in one embodiment an improved variable speed drive assembly incorporating a pair of polyphase alternating current machines. The assembly constituting this invention is capable of continuous speed variation through a range which extends in both directions from a stopped condition to twice the synchronous speed of the individual machines. The improved alternating current motor drive assembly exhibits constant torque operation at all speeds from standstill up either limit of its speed range.

An important feature of the improved alternating current motor drive assembly of the present invention is its ability to maintain constant speed at any setting in the range and despite variations in line frequency. This enables the improved drive assembly of the invention to be used in applications where precisely controllable speeds are required.

Another feature of the invention is the characteristic of the improved drive assembly which permits the control of speed through relatively wide limits. Such control of speed is obtained without resulting power losses which are inherent in most of the controls of the prior art arrangements.

The above and other features, objects and advantages of the present invention will become more apparent as the description proceeds, and particularly when reference is made to the accompanying drawings in which:

Figure 1 is a schematic representation of a drive assembly constructed in accordance with one embodiment of the invention and including an electrical machine of dual construction and whose speed is controllable in a manner to be described through a relatively wide range;

Figure 2 is a table showing certain operating characteristics of a typical machine constructed in accordance with the invention;

The drive assembly of the present invention includes a source of a variable frequency control signal. This source is represented as an oscillator in Figure 1 by the block 10. Any stable, low frequency oscillator generator is suitable for this purpose. For example, a three-phase variable frequency oscillator whose frequency is variable through a range from 0 to 60 cycles and which is capable of delivering up to 3 amperes at 110 volts. Many different types of such oscillators are presently available and a detailed description here of the internal construction and circuitry of the oscillator is believed to be unnecessary. Obviously, when so desired, the source 10 may also be a rotating electrical alternating current generator capable of exhibiting the characteristics described above.

The drive assembly of the embodiment of the invention illustrated in Figure 1 also includes a dual type of alternating current machine of particular construction which will be described. This dual machine may have a variety of configurations and, in fact, it may comprise two separate and distinct machines. Essentially, the machine includes a first primary winding and a first secondary winding which make up the portion indicated as A of the machine; and it includes a second primary winding and a second secondary winding which make up the portion represented as B of the machine.

The first primary winding may be held stationary so as to constitute a stator in the machine; the two secondary windings may rotate freely together on a single rotatable member; and the second primary winding may be rotatably independent of the secondary windings to constitute a rotor. This rotor may conveniently be coupled to the drive shaft of the machine.

Alternately, both primary windings may be mounted on the freely rotatable member, with the first secondary winding forming the stator of the machine and the second secondary winding forming the rotor. It will thus be seen that either the primary windings or the secondary windings may serve as the freely rotatable members. When one of the primary windings are freely rotatable, either one of the secondary windings may serve as the stator and the other secondary winding may serve as the rotor. Either one of the primary windings may serve as the stator and the other primary winding may serve as the rotor when the secondary windings are freely rotatable.

Figure 3:
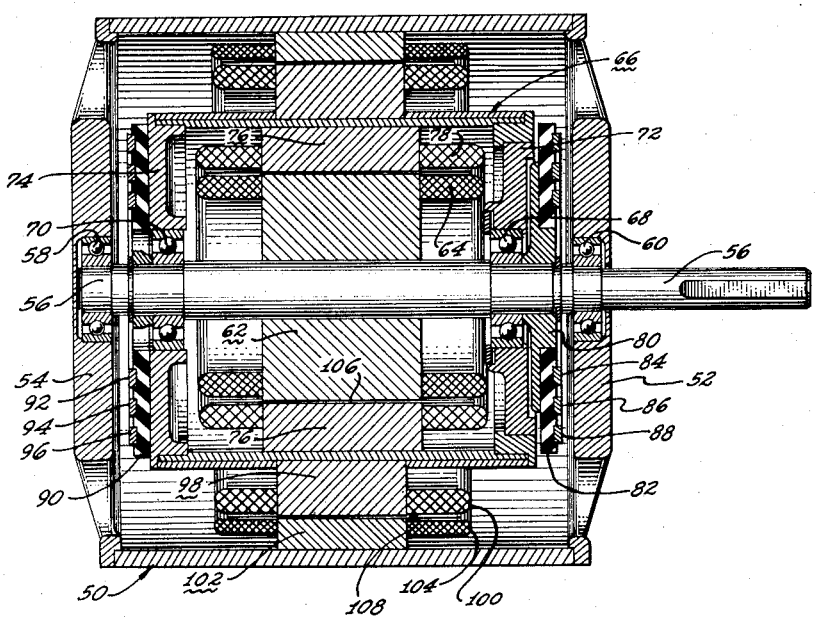
Figure 3 is a side sectional view of a dual type of alternating current machine which is constructed in accordance with a second embodiment of the invention and which is susceptible to speed control in the manner to be described in conjunction with Figure 1.
Figure 4:
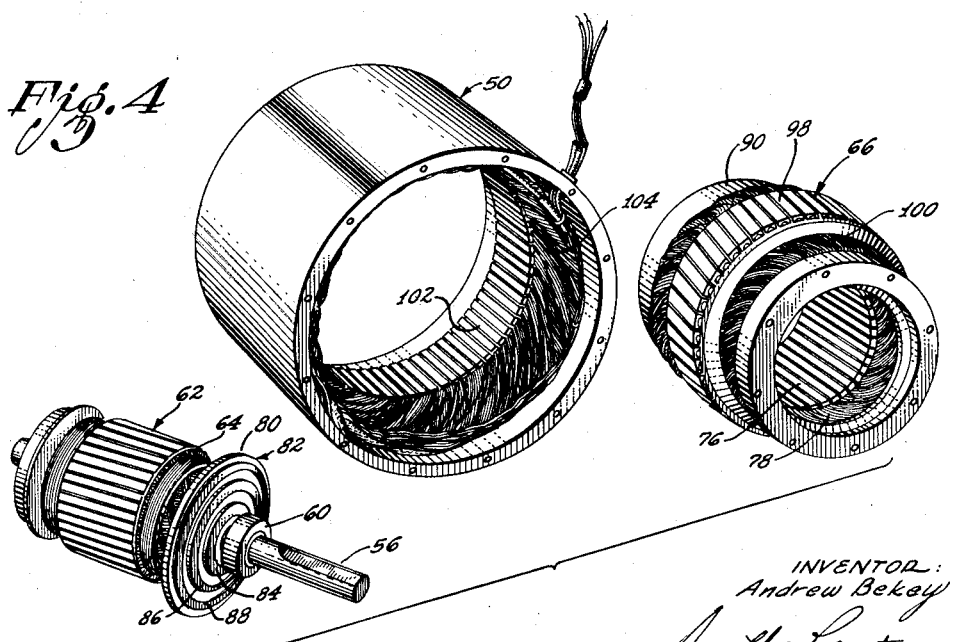
Figure 4 is a perspective exploded view of several of the components which are included in the machine of Figure 3.

Different types of machines are shown in Figures 1 to 4, inclusive, each of which incorporates the principles of the present invention and each of which will be described in detail. The air gaps between the various windings may be axial (as shown in Figure 1), or they may be radial (as shown in Figures 2 to 4, inclusive). The machine of Figure 1, as noted above, is shown in schematic form and will be used to describe the principles upon which the present invention is predicated.

The machine of Figure 1 includes a first secondary winding 12 which is held stationary and which forms a component of a stator 13 included in the machine. The first and second primaries 14 and 16 are mounted on a freely rotatable member 18 which, in turn, is supported in coaxial relation with the stator 13. The primary winding 14 and secondary winding 12 are inductively coupled and define a first axial air gap 20 between each other. These two windings are included in the portion A of the machine.

A second secondary winding 22 of the machine is mounted on a rotor 23, the rotor being coaxial with the freely rotatable member 18. The secondary winding 22 and the primary winding 16 are inductively coupled, and they form a second axial air gap 24 between each other. These two windings are included in the portion B of the machine referred to above. A drive shaft 25 is attached to the rotor 23, and this shaft extends along the axis of rotation of the rotor.

A three-phase alternating current power source 26 such as provided by the usual three-phase alternating current mains, is connected through a usual slip ring assembly to the primary windings 14 and 16 of the dual machine. The control oscillator 10 is connected through a usual slip ring assembly to the secondary winding 22, and the oscillator is directly connected through suitable terminals to the stator secondary winding 12.

The stator 13, the freely rotatable member 18, and the rotor 23 are constructed in accordance with alternating current motor principles to include a plurality of pole pieces. The windings 12, 14, 16, and 22 are wound with respect to these pole pieces and in accordance with alternating current motor principles. The construction is such that the windings 12 and 14, for example, and their associated magnetic circuits form a first wound rotor type of induction motor comprising the portion A of the machine; and the windings 22 and 16 and their associated magnetic circuits form a second wound rotor type of induction motor comprising the portion B of the machine. Each of these induction motors may be designed, for example, to be a three-phase, sixty cycle, six pole, one horsepower type, having a synchronous speed of 1200 r.p.m.

The dual machine is interconnected between its two portions A and B with respect to the power source 26 and to the control source 10 in a predetermined manner. Both the portions A and B of the machine operate as generalized transformers, alternators, or motors in a manner to be described; and each is capable of delivering or absorbing mechanical power, and of delivering or absorbing electrical power, also in a manner to be described.

Mechanically, and as described above, there is one stationary member in the machine of Figure 1 and that is the stator 13. The machine also includes the freely rotatable member 18, and the rotor 23 with its attached drive shaft 25. The primary windings 14 and 16, as noted above, are in the illustrated embodiment mounted on the freely rotatable member 18, and the secondary windings 12 and 22 are respectively mounted on the stator 13 and on the rotor 23. However, the location of the primary and secondary windings can be reversed.

In the embodiment of the invention shown in Figure 1, the two secondary windings 12 and 22 (through which current from the oscillator 10 is flowing) are connected so that they produce magnetomotive forces rotating in the same direction in the respective air gaps 20 and 24. The primary windings 14 and 16, on the other hand, are connected to produce magnetomotive forces (due to the current flowing through them from the source 26) which rotate in the air gaps 20 and 24 in a direction to oppose the secondary magnetomotive force in one of the air gaps and to assist the secondary magnetomotive force in the other air gap.

Consider now the condition in which no control voltage is applied to the secondary windings 12 and 22 in which the terminals of each of these windings are short circuited. The portions A and B of the machine now each operate simply as wound rotor induction motors, and the two portions will rotate at the same speeds but in opposite directions. Specifically, the primary windings 14 and 16 rotate in the same direction at the same speed but the primary winding 14 rotates in one direction with respect to the winding 12 and the primary winding 16 rotates in the opposite direction with respect to the winding 22. Therefore, the resultant speed of the shaft 25 will be zero since the secondary winding 12 is stationary. Any torque imposed on the shaft 25 under these conditions will not be opposed. This is because such torque would tend to decrease the slip of one of the portions of the machine and to cause the movable member of that portion to accelerate toward synchronous speed. It is well known that an induction motor cannot exert a torque in the direction of diminishing slip. Therefore, some other means must be used to lock the shaft 25 at standstill. This other means is the application of a direct current from the source 10 to the secondary windings. The application of this direct current produces an effect which will now be described.

When a direct voltage is applied to the secondary windings, each of the portions A and B of the dual machine operates as a synchronous motor. Therefore, the movable member of each portion rotates at synchronous speed but in the opposite direction to the rotatable member of the other. Specifically, the windings 14 and 16 rotate in the same direction at the same speed but the winding 14 rotates in one direction with respect to the winding 12 and the winding 16 rotates in an opposite direction with respect to the winding 22. Therefore, again the shaft 25 will be stationary since the winding 12 is stationary. However, now any torque exerted on the shaft 25 will be resisted, and all torques that are not sufficient to pull the machine out of synchronism will be so resisted. Therefore, to hold the shaft 25 stationary and to lock the shaft effectively while so held, it is appropriate for the source 10 to supply a direct current to the secondary windings 12 and 22.

If in the above example, the torque exerted on the shaft 25 is in the direction of rotation of the combined primary and secondary magnetomotive forces in the air gaps of the portion B of the dual machine, then this portion will function as a synchronous alternator. At the same time, the portion A of the machine, which is rotating in the opposite direction and which opposes the direction at which the torque is applied, operates as a loaded synchronous motor. Because the shaft output is zero, it is apparent that all the motor output from the portion A is used as the mechanical input to the portion B, and it is also apparent that the portion B returns the motor output of the portion A to the alternating current source 26 in the form of electrical energy. Therefore, no mechanical power can be derived under these conditions by applying a torque to the stationary shaft and all the mechanical input is converted to electrical output which is returned to the source 26.

In practicing the invention, a direct current exciting voltage is applied to the secondary windings 12 and 22 for locking the shaft 25 when it is in its zero rotating condition. The application of such direct current, unlike the mere shorting of the secondary terminals and for the reasons described above, enables the shaft in its stationary condition to oppose any applied torque and to be effectively locked.

It will be remembered that when the direct voltage is applied to the secondary windings 12 and 22, the freely rotatable member 18 rotates in one direction and at synchronous speed with respect to the stator 13, and the rotor 23 rotates at synchronous speed in the other direction with respect to the rotatable member 18. Therefore, the rotation of the shaft 25 with respect to the stator 13 is zero.

Now, if an alternating current voltage is applied to the secondary windings 12 and 22 from the control oscillator 10, the resulting current flow in the secondary windings sets up a circulating magnetomotive force in the corresponding air gaps 20 and 24. This circulating magnetomotive force in effect produces a controllable slip between the stator 13 and the freely rotatable member 18, on one hand, and between the rotatable member 18 and the rotor 23 on the other hand. The term "slip" is used loosely and for convenience. It is to be understood that actually the rotatable members rotate in synchronism with the vector sum of the magnetic fields in the respective air gaps. This secondary magnetomotive force is poled (as mentioned above) to oppose the primary magnetomotive force in one of the air gaps, so that the slip between the members corresponding to that air gap may be said to be positive, and to aid the primary magnetomotive force in the other air gap so that the slip between the members associated with the latter air gap may be said to be negative.

In other words:

The speed of the freely rotatable member 18 with respect to the stator is:

$$S_{18} = N_1 + N_2 \quad (1)$$

where $N_1$—speed of the M.M.F. in air gap 20 of the primary 14 in r.p.m.
$N_2$—speed of the M.M.F. in air gap 20 of the secondary 12 in r.p.m.
(Assume that the M.M.F.'s are aiding in the air gap 20.)

Also, the speed of the rotor 23 with respect to the freely rotatable member 18 is:

$$S_{23} = N_3 - N_4 \quad (2)$$

$N_3$—speed of M.M.F. in air gap 24 of the primary 16 in r.p.m.
$N_4$—speed of M.M.F. in air gap 24 of the secondary 22 in r.p.m.
(Assuming that the primary and secondary M.M.F.'s are opposing in the air gap 24.)

Therefore, the actual speed of the rotor 23 and, therefore, of the shaft 25 with respect to the stator 13:

$$S_{18} - S_{23} = N_1 + N_2 - N_3 + N_4 \quad (3)$$

It is clear that $N_1 = N_3$ and $N_2 = N_4$

Therefore:

$$S_{18} - S_{23} = 2N_2 \quad (4)$$

Also:

$$N_2 = 120 \times f_2 / p \quad (5)$$

where:

$f_2$—frequency of the signal from the source 10
$p$—number of poles of each portion Therefore the speed of the drive shaft 25 is:

$$S_{25} = 2 \times 120 \times f_2 / p \quad (6)$$

This means that the output shaft 25 can rotate with respect to the stator 13 when an alternating current is passed through the secondary windings 12 and 22. The direction of rotation of the shaft can be reversed by reversing the line connections to the secondaries or to the primaries so that the M.M.F.'s will oppose in the air gap 20 and aid in the air gap 24.

Equation 6 shows that the rotational speed of the drive shaft 25 depends only on the frequency of the control signal from the source 10. Therefore, changes in the frequency of the alternating current source 26 have no effect on the speed of the shaft 25. This is evident when it is realized that a change in the frequency of the current from the source 26 provides merely that the freely rotatable member 18 will change its rotational speed in one direction, and the oppositely rotating rotor 23 will change its speed by the same amount and in a direction such that the net change of the speed of the drive shaft 25 with respect to the stator 13 is zero.

It is also noted from Equation 6 that the speed of the shaft 25 varies as a function of twice the variation of the frequency of the signal from the control source 10. This has a practical advantage since it enables control oscillators of a relatively narrow frequency variation to be used to control the speed of the shaft 25 through a relatively wide range. This double effect of the frequency variation from the source 10, of course, lies in the fact that a change in this frequency speeds up, for example, the rotation of the member 18 in a particular direction and slows down the rotation of the rotor 23 in the opposite direction and by the same amount. Therefore, a double effect is manifested in the speed of the drive shaft 25 with respect to the stator 13.

The operation of the machine of Figure 1 under full load will now be discussed. It will be assumed that the secondary M.M.F. in the air gap 20 is aiding the primary M.M.F., and that the secondary M.M.F. in the air gap 24 is opposing the primary M.M.F. Under these conditions, the freely rotatable member 18 rotates with respect to the stator 13 at a speed above synchronous speed, and the rotor 23 rotates in the opposite direction with respect to the freely rotatable member 18 and at a speed below synchronous speed. Therefore, the shaft 25 rotates with respect to the stator 13 and in the same direction as the freely rotatable member 18 and at a greatly reduced speed.

Under the conditions described in the preceding paragraph, and when the shaft 25 is loaded by an externally applied torque, this torque is in a direction to oppose shaft rotation. That is, the applied torque will be in the direction of the relative rotation between the rotor 23 and the freely rotatable member 18. Therefore, the portion B of the machine will function as an alternator. Also, the direction of applied torque will be in the opposite direction to the rotation of the freely rotatable member 18 with respect to the stator 13 so that the portion A of the machine functions as an alternating current motor.

Of course, when the conditions are reversed so that the secondary M.M.F. in the air gap 20 opposes the primary M.M.F. and the secondary M.M.F. in the air gap 24 aids the primary M.M.F. in that air gap, then the portion A will function as an alternator and the portion B will function as a motor. That is, when the loading torque is applied in the opposite direction to the shaft 25.

The table of Figure 2 represents a typical constructed embodiment of the machine of Figure 1, the machine operating under conditions in which the portion A functions as an alternator and the portion B functions as a motor. The table shows the effect on the machine of varying the frequency of the control signal from the source 10, of, for example, from 0 to 60 cycles. In the tabulated illustration, the machine is assumed to incorporate a pair of three-phase, one horsepower, six-pole motors whose individual synchronous speed is 1200 r.p.m. Also, the source 26 is assumed to provide a three-phase alternating current 60 cycle voltage at, for example 110 volts.

The shaft, under this example, is assumed to be mechanically loaded with 4.38 ft. lbs., the normal torque for 1200 r.p.m. and one horsepower.

In the condition A of the table and when the frequency of the signal from the source 10 is zero, that is, when the source 10 applies a direct voltage to the secondaries 12 and 22, as described above, the portions A and B rotate at synchronous speed but in the opposite directions. Therefore, and as indicated, the shaft output speed is zero. Under these conditions, the input to the portion B of the machine from the source 26 is 1 horsepower. Also, the input from the portion A to the portion B is zero because the latter is operating at synchronous speed. Therefore, the total input to the portion B is 1 horsepower under these conditions.

Therefore, under the condition A the shaft output of the portion B is zero because the output shaft 25 is stationary. The portion B, which is operating as a motor, therefore transfers one horsepower back to the machine A in mechanical energy. All the electrical output from the portion A which is operating as an alternator is returned to the source 26. Therefore one horsepower is returned to the source 26. It will be noted that in the above discussion and in the ensuing discussion the electrical losses in the machine will be ignored.

Now, when the source 10 is controlled so that it applies a signal of 6 cycles per second to the secondary windings 12 and 22, we have the condition B in the table of Figure 2. Under these conditions, the portion B of the machine speeds up above the synchronous speed to a speed of 1320 r.p.m., and the portion A slows down to a speed below synchronous speed of 1080 r.p.m. in accordance with Equation 4 since each of the portions A and B is assumed to have six poles. The shaft 25 begins to rotate, and the shaft rotates at 240 r.p.m. The portion B continues to function as a motor and it continues to draw one horsepower in electrical energy from the source 26. Also, and to provide for the additional speed of the portion B, the portion A supplies electrical energy to the portion B of the amount of .1 horsepower because the speed of the portion B is running at 10 percent above synchronous speed. Therefore, the total electrical input to the portion B is 1.1 horsepower and the shaft output is .2 horsepower. Therefore, the portion B returns mechanical energy back to the portion A of an amount equal to .9 horsepower. Because the portion A supplies only .1 horsepower in electrical energy to the portion B, the remaining .8 horsepower is returned to the source 26 in the form of electrical energy. For convenience, the increased speed of the portion B is referred to in the table of Figure 2 as "slip frequency."

When the control frequency is increased to 15 cycles per second, the condition of column C in the table of Figure 2 prevails. As before, the portion B continues to operate as a motor and continues to draw 1 horsepower from the source 26. The internal speed of the portion B now increases to 1500 r.p.m., and the internal speed of the portion A is reduced to 900 r.p.m. when each of the portions A and B has 6 poles. The shaft 25 is now driven at 600 r.p.m. The electrical input to the portion B from the portion A to make up for the increased speed of the portion B is now increased to .25 horsepower and the total input to the machine B is now 1.25 horsepower. The shaft output of the portion B is .50 horsepower, so this portion transfers .75 horsepower back to the portion B in the form of mechanical energy. The portion A required .25 horsepower for its drive of the portion B so that it returns .5 horsepower in electrical energy to the source 26.

It can be seen, therefore, that the portion B functions as a motor. The motor operates at synchronous speed and draws its full load of 1 horsepower in electrical energy from the source 26. However, the portion A functions as an alternator and supplies additional electrical energy to the motor B so that the motor is driven above synchronous speed in the described manner. The excess of mechanical energy of the machine B is fed back to the portion A, and this mechanical energy is converted in the portion A to electrical energy, the latter being used to drive the portion B and any excess being returned to the line or source 26. Therefore, there are no losses inherent in the system in the control of the speed of the shaft 25.

Now, when the frequency from the source 10 is increased to 30 cycles per second, the speed of the portion B is increased to 1800 r.p.m., and that of the portion A is reduced to 600 r.p.m. when each of the portions A and B has 6 poles. The shaft 25 now rotates at 1200 r.p.m. or synchronous speed. The input to the portion B from the source 26 continues at the full load 1 horsepower, and the portion A supplies an additional .5 horsepower because the rotation of the portion B must be increased above synchronous speed so that the rotation of the shaft 25 will be at synchronous speed with respect to the stator 13. Therefore, the total input to the portion B under this condition is 1.5 horsepower and its shaft output is the full load 1 horsepower. The portion B, therefore, transfers .5 horsepower in mechanical energy back to the portion A, and all this is used to obtain sufficient electrical energy for driving the portion B at the increased speed. Therefore, under these conditions, no electrical energy is returned to the source 26. Therefore, the dual machine draws 1 horsepower from the source 26 to obtain full load 1 horsepower output at the shaft 25. Again, and apart from usual heat and eddy current losses, there are no speed control losses inherent in the system.

In the condition of column E of Figure 2, the control frequency is increased to 45 cycles per second. Now the portion B increases its speed to 2100 r.p.m. and the portion A decreases its speed to 300 r.p.m. The shaft 25 is now driven at 1800 r.p.m. The portion B continues to draw 1 horsepower in electrical energy from the source 26, and this portion also draws .75 horsepower in electrical energy from the portion A. The total input to the portion B is, therefore, 1.75 horsepower. The shaft output is now 1.5 horsepower which is greater than the portion B alone is able to provide. At this time, .25 horsepower is returned to the portion A in mechanical energy. The portion A, however, is required to deliver .75 horsepower in electrical energy for the portion B. Therefore, the portion A now functions as a hybrid transformer and alternator and it draws .5 horsepower from the source 26. The source 26, therefore, delivers a total of 1.5 horsepower and again, there are no inherent losses, for the output power on the shaft 25 is 1.5 horsepower.

The column F in the table of Figure 2 represents the extreme condition of the system in which the frequency from the control source is increased to 60 cycles. Now, the portion B rotates at 2400 r.p.m. and the speed of the portion A is reduced to zero. The shaft speed is also 2400 r.p.m. The portion B continues to draw 1 horsepower from the source 26 in electrical energy, and it also draws 1 horsepower from the portion A in electrical energy. The portion B feeds no mechanical energy back to the portion A, and the latter portion operates as a transformer. The portion A draws 1 horsepower in electrical energy from the source 26 and supplies 1 horsepower in electrical energy to the portion B. The shaft 25 is now driven at twice synchronous speed and its power output is 2 horsepower.

It is evident, therefore, that the variable speed drive assembly of Figure 1 is capable of providing a stepless speed variation for the output shaft 25. This is obtained merely by varying the frequency of the voltage from the source 10. As previously noted, the actual speed of the drive assembly depends on the frequency of the voltage from the source 10 and is independent of line frequency from the source 26. Therefore, by constructing the source 10 to be an extremely stable oscillator or like mechanism, the output speed of the shaft 25 may be precisely controlled to any desired value from standstill up to double synchronous speed, and it may be precisely held at that value.

Unlike the prior art arrangements, there are no inherent losses in the speed control. Nor does the drive assembly require external or internal extraneous commutator machines which, in the prior art, served a sole function of fulfilling the speed control requirements. In the manner described, electrical power flows from the slow portion of the machine to the past portion, and mechanical power flows from the fast portion to the slow portion, with any excess electrical power being fed back to the source. This transfer of power flows freely in the internal components of the illustrated dual machine itself. The output power of the machine increases from zero at standstill to 2 horsepower at double synchronous speed. It can be seen, therefore, that full use is made of the two portions of the machine for the overall conversion of electrical energy into mechanical power.

The embodiment of Figures 3 and 4 is similar in some respects to that of Figure 2 as described above, and the embodiment of Figures 3 and 4 operates on exactly the same principles. However, the mechanical arrangement of the embodiment of Figures 3 and 4 is such that radial air gaps, rather than axial air gaps are used.

The dual machine of Figures 3 and 4 includes a usual casing 50 which is mounted on any suitable stationary support bracket (not shown). The casing 50 has a pair of end portions 52 and 54 and a drive shaft 56 is rotatably mounted in the end portions. The drive shaft 56 is supported in the end portions by respective bearings 58 and 60. The bearing 58 rotatably mounts the shaft in the rear portion 54 of the casing, and the bearing 60 rotatably mounts the shaft in the forward portion 52 of the casing.

A rotor 62 is supported on the drive shaft 56 in known manner, and this rotor includes a winding 64. As in the case of the embodiment of Figure 1, the rotor 62 and its winding 64 may be constructed in accordance with well known alternating current motor principles. For example, this rotor may be wound to constitute a three-phase six-pole assembly.

A freely rotatable member 66 is mounted on the shaft 56 by means of a pair of bearings 68 and 70. The bearing 68 rotatably mounts the member 66 at its forward end, and the bearing 70 rotatably mounts the member 66 on the shaft 56 at its rear end. The freely rotatable member 66 includes a pair of disk-like end portions 72 and 74 which respectively engage the bearings 68 and 70.

The freely rotatable member 66 supports on its inner peripheral surface an assembly 76 which may be considered a stator insofar as the rotor 62 is concerned. The stator 76 has a winding 78 associated with it, and this assembly also is constructed in accordance with known motor principles. It can be seen that the stator 76 and the rotor 62 are mounted in nested concentric relation.

A disk-like structure 80 is mounted on the forward end of the shaft 56 within the casing 50 and adjacent the portion 72 of the freely rotatable member 66. The member 80 may be composed of a conductive metal, and it has a disk-like insulating insert 82 secured to its front surface. The insulating member 82 supports a series of slip rings 84, 86, 88 and these slip rings are connected to the winding 64 on the rotor 62 in known manner. Suitable brushes, not shown, engage respective ones of the slip rings 84, 86 and 88 so that external connections may be made to the winding 64.

A disk-like insulating member 90 is secured to the rear face of the portion 74 of the freely rotatable member 66. A second series of conductive slip rings 92, 94 and 96 are affixed to the insulating member 90 in nested concentric relation. These latter slip rings are connected to the stator winding 78 which, like the rotor winding 64, may be a usual three-phase, six-pole type. The slip rings 92, 94 and 96 permit external connections to be made to the winding 78 associated with the stator 76.

What may be considered a rotor 98 is mounted on the outer peripheral surface of the freely rotatable member 66. The rotor 98 is also positioned in nested concentric relation with the stator 76 and the rotor 62. The rotor 98 has a winding 100 associated with it, and this rotor likewise is constructed in accordance with known motor or alternator principles to constitute a three-phase, six-pole assembly, for example. The winding 100 is connected in shunt with the winding 78 in the manner described in conjunction with Figure 1, and the slip rings 92, 94 and 96 serve to bring common external connections to these windings.

A stator 102 is mounted on the internal peripheral surface of the casing 50 in nested concentric relation with the rotor 98. The stator 102 has a winding 104 associated with it, and appropriate external connections (not shown) are made to this latter winding.

The rotor 62 and stator 76 are separated by a radial air gap 106 and these components form the portion B of the machine. The rotor 98 and the stator 102, on the other hand, are separated by an air gap 108 and these latter components constitute the portion A of the dual machine.

Now, and as in the embodiment of Figure 1, the windings 78 and 100 may constitute the primary windings, and these windings are connected through the slip rings 92, 94 and 96 to the source 26. The windings 104 and 64, on the other hand, may constitute the secondary windings, and these windings are connected to the source 10 of Figure 1. The winding 64 is connected to the source through the slip rings 84, 86 and 88, and the winding 104 is connected to that source in parallel with the winding 64 and through appropriate connections.

Therefore, and in the same manner as in the embodiment of Figure 1, the motor of Figures 3 and 4 may be controlled and energized to obtain a variable speed for its drive shaft 56.

Figure 5:
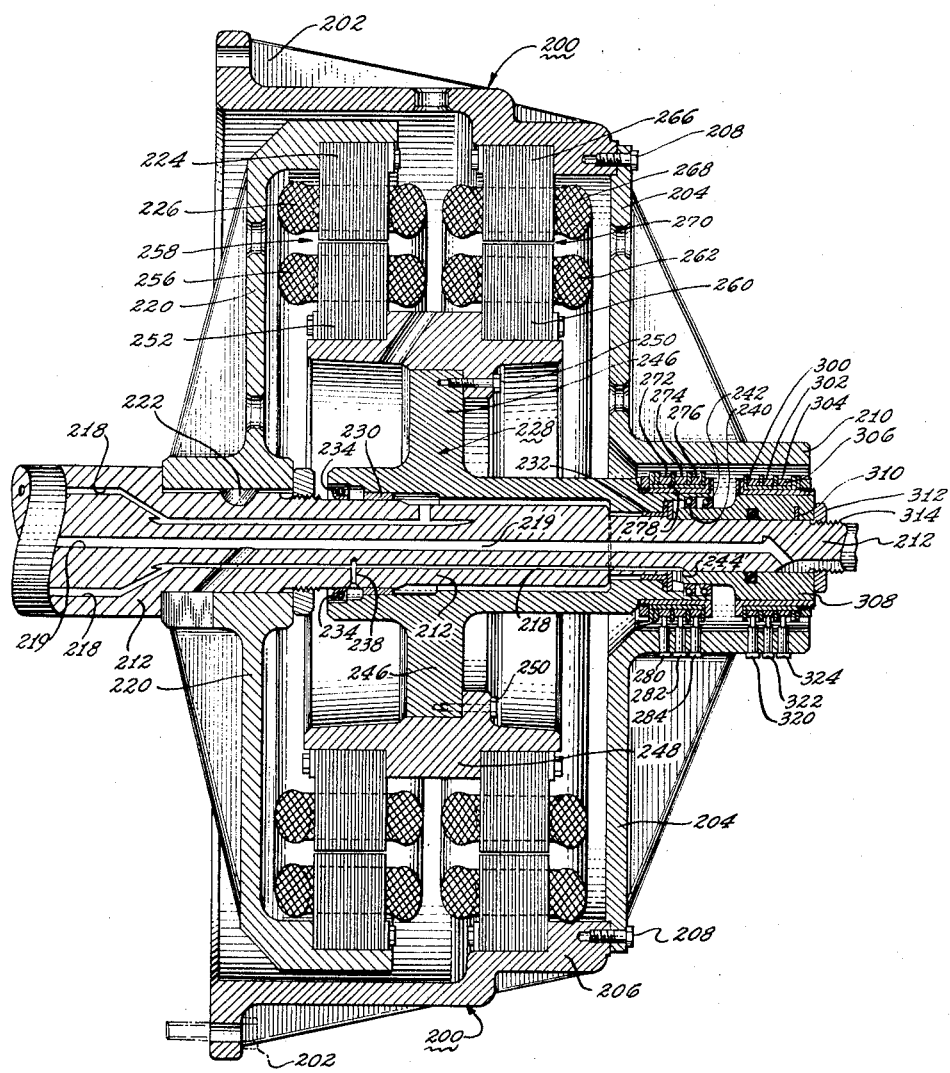
Figure 5 is a sectional view of a machine also suitable for speed control and constructed in accordance with still another embodiment of the invention.

The embodiment of Figure 5 also is predicated upon the same operating principles as the previous embodiments and also utilizes radial air gaps between the various components of the assembly.

The latter embodiment includes a casing 200 which is supported on any suitable stationary base by means, for example, of a plurality of bolts 202. The casing 200 has a forward end portion 204 of disk-like configuration and which is secured to a peripheral portion 206 of the casing by means of a series of screws 208. The end portion 204 defines a cylindrical hub designated as 210, and this hub is coaxial with the longitudinal axis of the assembly. The rear end of the casing 200 is open.

A drive shaft 212 is rotatably mounted and extends through the casing 200 along the longitudinal axis of the casing and through the hub 210. This drive shaft is journalled in appropriate supporting means (not shown).

Suitable oil ducts 218 extend through the drive shaft for lubricating purposes. A further central duct 219 is also provided, and this latter duct serves as a conduit for electrical leads extending into the machine.

A rotatable member 220 is keyed by a woodruff key 222 to the drive shaft 212 near the open end of the casing 200. The rotatable member 220 supports a rotor assembly 224, and this rotor includes a winding 226. The rotor 224 and its associated winding 226 are constructed, as in the previous embodiment, in accordance with well known alternating current motor principles. When the shaft 212 is rotated, the rotor 224 is also rotated within the casing 200. A freely rotatable member 228 is rotatably mounted on the shaft 212 within the casing 200. This is achieved by means of bearing surfaces 230 and 232 mounted between the rotatable member 228 and the shaft 212 at the opposite ends of the rotatable member. An appropriate lubrication seal 234 is provided for the bearing 230. Lubricant is supplied to the bearing 230 from the lubrication duct 218 through a conduit 238. Likewise, suitable seals 240 are provided for the bearing 232, and lubricant is supplied to this bearing from the lubrication duct 218 through a conduit 244.

The freely rotatable member 228 has a radial portion 246. The member 228 also includes a cylindrical portion 248 of non-magnetic material such as aluminum. The portion 248 is secured to the radial portion 246 by a series of screws 250.

The cylindrical portion 248 of the rotatable member 228 supports what may be termed a stator 252. This stator includes a winding 256. The stator 252 is supported to be concentric with the rotor 224, and these two elements are separated by a radial air gap 258.

The cylindrical portion 248 of the freely rotatable member 228 also supports at its other end what may be termed a rotor 260. This rotor includes a winding 262. The rotor 260, like the stator 252 and the rotor 224 may all be constructed in accordance with known alternating current motor principles. As in the previous embodiment, these elements may each be constructed to be a three-phase, six-pole type. A stator 266 is supported by the annular portion 206 of the casing 200 in concentric relation with the rotor 260. The stator 266 includes a winding 268, and a radial air gap 270 separates the stator 266 from the rotor 260.

Appropriate electrical connections may be made to the stator 266 through usual stationary terminals (not shown). Connections are made to the windings 256 and 262 through a series of slip rings 272, 274 and 276. These slip rings are supported on an insulating collar 278 within the hub 210 and this collar is mounted on the end of the freely rotatable member 228. A corresponding series of brushes 280, 282 and 284 are mounted in the hub 210, and these brushes extend through the hub into respective electrical contact with the slip rings 272, 274 and 276. Then, and in a manner known to the art, appropriate electrical connections can be made to the brushes 280, 282 and 284 to excite the windings 256 and 262 which, as in the previous embodiments, are connected in shunt.

Electrical connections are made to the rotor winding 226 through a series of slip rings 300, 302 and 304. These slip rings are supported on an insulating collar 306 at the end of the hub 210. The collar 306 is mounted on a cylindrical member 308 which is mounted on the shaft 212, and which is affixed to the shaft by a suitable radial set screw 310. The cylindrical member 308 is held on the shaft against axial motion by a nut 312 which is screwed to a threaded portion 314 at the end of the shaft.

Electrical connections are made to the slip rings 300, 302 and 304 through respective brushes 320, 322 and 324. These brushes, like the brushes 280, 282, and 284 extend through the hub 210. The brushes 320, 322 and 324, in a manner known to the electrical motor art, respectively engage the slip rings 300, 302 and 304 to establish electrical connections with the winding 226 of the rotor 224. The connections from the slip rings 272, 274 and 276 to the windings 256 and 262 are not shown, but may be made in any suitable manner. Likewise, the connections from the slip rings 300, 302 and 304 to the rotor winding 226 also are not shown but may be made in any suitable manner.

In a manner similar to the embodiment described in conjunction with Figure 1, the windings 256 and 262 may constitute the primary windings and these windings may be energized from the source 26 through appropriate connections to the brushes 280, 282 and 284. The windings 226 and 268, on the other hand, may constitute the secondary windings of the assembly. Appropriate connections may be made from the source 10 of Figure 1 to these secondary windings through the stationary terminals (not shown) of the winding 268, and through the brushes 320, 322 and 324 to the winding 226. Therefore, and as in the previous embodiments, the assembly of Figure 5 may be driven and controlled so that its shaft 212 may be driven at any desired speed, and which speed may be controlled through a range.

The invention provides, therefore, an improved electric drive assembly in which alternating current motors are driven and controlled through a relatively wide range of speed and without any losses attendant to such control. In the manner described, the dual machine and assembly of the invention is capable of a continuous speed range which extends through standstill to double synchronous speed in both directions. The change of speed of the assembly is stepless, and the assembly exhibits constant torque operation at all speeds including standstill. The assembly may be controlled precisely to any desired speed down to standstill and through a range of barely perceptible motion. At all speeds, the machine is operating inherently synchronously with the established fields. Also, the mechanism exhibits a speed that is independent of line frequency variations so as to render the equipment ideally suited for uses where precisely stabilized speed is desired.

The described mechanisms operate essentially as non-salient pole synchronous motors. The line current of the machines can be made leading, unity or lagging merely by changing the magnetizing current through the variable frequency supply source 10. Also, an additional feature which is important in many practical applications is the fact that the circuit parameters of the two portions of the dual machines can be made slightly different. This difference can be such that the current circulating the slip power between the two portions can over-excite the one acting as a motor. As a consequence, the pull-out torque and power factor with respect to the source 26 can be corrected.

Although the now preferred embodiment of the present invention has been shown and described herein, it is to be understood that the invention is not to be limited thereto, for it is susceptible to changes in form and detail within the scope of the appended claims.

I claim:

1. A variable speed drive assembly including, first means including first and second windings rotatable with respect to one another, the first means having properties for obtaining the production of a magnetomotive force in the first means upon the introduction of electrical energy to at least one of the windings, second means including third and fourth windings rotatable with respect to one another, the second means having properties for obtaining the production of a magnetomotive force in the second means upon the introduction of electrical energy to at least one of the third and fourth windings, means coupled to the first winding and the third winding for introducing first electrical energy to said first winding and said third winding to establish a first magnetomotive force in said first means and in said second means, and means coupled to the second winding and the fourth winding for introducing second electrical energy to said second winding and said fourth winding with particular polarities relative to the introduction of energy to the first and third windings to establish a second magnetomotive force in said first means in aiding relation with said first magnetomotive force and to establish said second magnetomotive forces in said second means in opposing relation with said first magnetomotive force.

2. A variable speed drive assembly including, first means including first and second windings rotatable with respect to one another, the first means having properties of producing a magnetomotive force in the first means upon introduction of electrical energy to at least one of the first and second windings, second means including third and fourth windings rotatable with respect to one another, the second means having properties of producing a magnetomotive force in the second means upon the introduction of electrical energy to at least one of the third and fourth windings, means mechanically coupling a particular one of the windings of said first means to a particular one of the windings of said second means, means coupled to the first and third windings for introducing first electrical energy to said first winding and said third winding to establish a first magnetomotive force in said first means and in said second means, and means coupled to the second and fourth windings for introducing second electrical energy to said second winding and said fourth winding of particular polarities relative to the introduction of electrical energy to the first and third windings to establish a second magnetomotive force in said first means in aiding relation with said first magnetomotive force and to establish said second magnetomotive force in said second means in opposing relation with said first magnetomotive force.

3. A variable speed drive assembly including, first means including first and second windings rotatable with respect to one another and having a magnetic coupling to each other, second means including third and fourth windings rotatable with respect to one another and having a magnetic coupling to each other, means to provide a mechanical coupling between a particular one of the windings of said first means and a particular one of the windings of said second means, a stationary supporting means mechanically coupled to the other winding of said first means, a drive shaft mechanically coupled to the other winding of said second means, means electrically coupled to the first and third windings for introducing first alternating current electrical drive energy at a particular frequency to said first winding and said third winding to establish a first magnetomotive force in said first means and in said second means, and means electrically coupled to said second and fourth windings for introducing second alternating current electrical energy of variable frequency to said second winding and said fourth winding in particular polarities relative to the introduction of energy to the first and third windings to establish a second magnetomotive force in said first means in aiding relation with said first magnetomotive force and to establish said second magnetomotive force in said second means in opposing relation with said first magnetomotive force.

4. A variable speed drive assembly including, a first portion including first and second windings rotatable with respect to each other and magnetically coupled to each other, stationary support means mechanically coupled to said first winding, a second portion including third and fourth windings rotatable with respect to each other and magnetically coupled to each other, means mechanically intercoupling said second and third windings, means mechanically coupled to said fourth winding, means electrically coupled to said first and fourth windings for introducing first alternating current electrical energy to said first and fourth windings to establish a first magnetomotive force in said first portion and in said second portion, and means electrically coupled to the second and third windings in a particular relationship second alternating current electrical energy to said second and third windings in particular polarities relative to the introduction of electrical energy to the first and fourth windings to establish a second magnetomotive force in said first portion and in said second portion, said second magnetomotive force opposing said first magnetomotive force in one of said portions and said second magnetomotive force aiding said first magnetomotive force in the other of said portions.

5. A variable speed drive assembly including, a first alternating current electrical machine including first and second windings rotatable with respect to one another and inductively coupled to one another, stationary supporting means mechanically coupled to said first winding, a second alternating current electrical machine including third and fourth windings rotatable with respect to one another and inductively coupled to one another, means mechanically intercoupled to said second and third windings to provide a rotation of the second and third windings at the same speed, means mechanically coupled to said fourth winding, means electrically coupled to the first and fourth windings for introducing first alternating current electrical energy to said first and fourth windings to establish a first magnetomotive force in each of said alternating current electrical machines, and means electrically coupled to the second and third windings in a particular relationship to the electrical coupling to the first and fourth windings for introducing second alternating current electrical energy to said second and third windings to establish a second magnetomotive force in each of said alternating current electrical machines and of a polarity opposing said first magnetomotive force in one of said machines and aiding said first magnetomotive force in the other of said machines.

6. A variable speed drive assembly including a first alternating current machine having a stator winding and a rotor winding, a second alternating current machine having a stator winding mechanically coupled to said rotor winding of said first machine and further having a rotor winding, stationary support means for said stator winding of said first machine, a drive shaft mechanically coupled to said rotor winding of said second machine, means for providing for the introduction of first alternating current electrical driving energy to one of the windings of said first machine and one of the windings of said second machine to establish a first magnetomotive force in each of said machines, a control source of variable frequency alternating current electrical energy, and means for connecting the other winding of each said machines to said control source to establish a second magnetomotive force in each of said machines, said second magnetomotive force opposing said first magnetomotive force in one of said machines and aiding said first magnetomotive force in the other of said machines.

7. A variable speed drive assembly including a first alternating current machine having a primary winding and a secondary winding in mutually inductive relation and rotatable with respect to one another, stationary support means for one of said windings of said first machine, a second alternating current machine having a primary winding and a secondary winding in mutually inductive relation and rotatable with respect to one another, means for mechanically coupling one of said windings of said second alternating current machine to the other of said windings of said first alternating current machine, a drive shaft mechanically coupled to the other of said windings of said second alternating current machine, means for providing for the introduction of first alternating current driving energy to said primary windings of said first and second machines to establish a first magnetomotive force in each of said machines, a control source of variable frequency alternating current electrical energy, and means for connecting said control source to said secondary windings of each of said machines to establish a second magnetomotive force in each of said machines, said second magnetomotive force opposing said first magnetomotive force in one of said machines, and said second magnetomotive force aiding said first magnetomotive force in the other of said machines.

8. A variable speed drive assembly including, a stationary member, a first stator winding mounted on said stationary member, a first rotatable member, a first rotor winding mounted on said first rotatable member in inductive relation with said first stator winding and defining a first air gap therewith, a second stator winding mounted on said first rotatable member, a second rotatable member, a second rotor winding mounted on said second rotatable member in inductive relation with said second stator winding and defining a second air gap therewith, means for providing for the introduction of first alternating current electrical energy to two of said windings to establish a first magnetomotive force in said first and second air gaps, and means for providing for the introduction of second alternating current electrical energy to the other two of said windings to establish a second magnetomotive force in said first and second air gaps, said second magnetomotive force aiding said first magnetomotive force in one of said air gaps and opposing said first magnetomotive force in the other of said air gaps.

9. A variable speed drive assembly including, a stationary member, a first stator winding mounted on said stationary member, a first rotatable member spaced axially from said stationary member and rotatable about an axis extending through the center of said stationary member, a first rotor winding mounted on said first rotatable member in inductive relation with said first stator winding and spaced axially from said first stator winding in coaxial relation therewith and defining a first axial air gap with said first stator winding, a second stator winding mounted on said first rotatable member and spaced axially from said first rotor winding in coaxial relation therewith, a second rotatable member spaced axially from said first rotatable member in coaxial relation therewith and on the opposite side to said first rotatable member as said stationary member, a second rotor winding mounted on said second rotor winding mounted on said second rotatable member in inductive relation with said second stator winding coaxial with and spaced axially from said second stator winding to define a second axial air gap therewith, means for providing for the introduction of first alternating current electrical energy to two of said windings to establish a first magnetomotive force in said first and second air gaps, and means for providing for the introduction of second alternating current electrical energy to the other two of said windings to establish a second magnetomotive force in said first and second air gaps, said second magnetomotive force aiding said first magnetomotive force in one of said air gaps, and said second magnetomotive force opposing said first magnetomotive force in the other of said air gaps.

10. The assembly defined in claim 8 in which the frequency of said second alternating current is variable through a selected frequency range to control the speed of the second rotor with respect to said first stator, and in which the frequency of said second alternating current is capable of being reduced to zero to provide a direct current for locking said second rotor into a fixed relation with respect to said first stator in a standby condition.

11. A variable speed drive assembly including, a stationary member, a first stator winding mounted on said stationary member, a first rotatable member mounted in coaxial relationship within said first stator winding and surrounded by said first stator winding, a first rotor winding mounted on the external periphery of said first rotatable member in inductive relation with said first stator winding and in nested concentric relation within said first stator winding and defining a first radial air gap therewith, a second stator winding mounted on the internal peripheral surface of said first rotatable member in nested concentric relationship with said first rotor winding and surrounded by said first rotor winding, a second rotatable member mounted in concentric relationship with said second stator member and surrounded by said second stator member, a second rotor winding mounted on said second rotatable member in inductive relationship with said second stator winding and in concentric nested relationship with said second stator winding and defining a second radial air gap therewith, means for providing for the introduction of first alternating current electrical energy to two of said windings to establish a first magnetomotive force in said first and second radial air gaps, and means for providing for the introduction of second alternating current electrical energy to the other two of said windings for establishing a second magnetomotive force in said first and second radial air gaps, said second magnetomotive force aiding said first magnetomotive force in one of said air gaps and opposing said first magnetomotive force in the other of said radial air gaps.

12. A variable speed drive assembly including, a stationary member, a first stator winding mounted on the inner peripheral surface of said stationary member, a first rotatable member mounted coaxially with said first stator winding and surrounded by said first stator winding, a first rotor winding mounted on the outer peripheral surface of said first rotatable member in inductive relation with said first stator winding and in nested concentric relationship therein and defining a first radial air gap therewith, a second stator winding mounted on the outer peripheral surface of said first rotatable member and spaced axially from said first rotor winding in coaxial relation therewith, a second rotatable member mounted in coaxial relationship with said first rotatable member and having an inner peripheral surface surrounding said second stator winding, a second rotor winding mounted on said inner peripheral surface of said second rotatable member in inductive relationship with said second stator winding and surrounding said second stator winding in concentric nested relationship, said second rotor winding defining a second radial air gap with said second stator winding, means for providing for the introduction of first alternating current electrical energy to two of said windings to establish a first magnetomotive force in said first and second radial air gaps, and means for providing for the introduction of second alternating current electrical energy to the other two of said windings to establish a second magnetomotive force in said first and second air gaps, said second magnetomotive force aiding said first magnetomotive force in one of said air gaps and opposing said first magnetomotive force in the other of said air gaps.

13. A variable speed drive assembly, including, means for providing for the introduction of a first alternating voltage at a particular frequency, means for providing for the introduction of a second alternating voltage adjustable through a range of frequencies, first motive means connected to the first and second voltage means for operation as a motor at a speed above the first alternating frequency, second motive means mechanically coupled to the first motive means in driven relationship to the first motive means and connected to the first and second voltage means for operation as a generator at a speed below the first alternating frequency to feed electrical energy to the first voltage means and to the first motive means for the production of output power in the first motive means.

14. A variable speed drive assembly, including, means for providing for the introduction of a first alternating voltage at a particular frequency, means for providing for the introduction of a second alternating frequency and for providing for an adjustment of the frequency through a particular range, first motive means including first and second members respectively connected to receive the first and second voltages for rotation of the first member relative to the second member in a first direction at a speed above the frequency of the first alternating voltage to obtain the operation of the motive means as a motor, second motive means including a first member mechanically coupled to the second member of the first motive means and electrically connected to the first and second voltage means and including a second member electrically connected to the second voltage means for rotation of the first member relative to the second member in the first direction at a speed below the frequency of the first alternating voltage to obtain the operation of the second motive means as a generator for the introduction of electrical energy back to the first voltage means and to the first motive means for the production of output power in the first member of the first motive means.

15. A variable speed drive assembly as set forth in claim 14 in which the second member of the second motive means is maintained stationary and in which the first and second members of the first motive means and the first and second members of the second motive means respectively rotate at speeds substantially equally above and below the first alternating frequency by correspondingly equal amounts and by amounts directly related to the second alternating frequency and in which the first member of the first motive means serves as the output means and rotates at a speed directly related to the frequency of the second alternating signals.

16. A variable speed drive assembly, including, means for providing for the introduction of a first alternating voltage at a particular frequency, means for providing for the introduction of a second alternating voltage adjustable through a range of frequencies, first motive means including first and second magnetically responsive members connected to the first and second voltage means to produce magnetic fields having frequencies dependent upon the frequency of the voltage from the first and second means and rotatable in a first direction relative to each other and at a speed dependent upon the frequency of the magnetic fields and above the frequency of the voltage from the first means, and second motive means including first and second magnetically responsive members connected to the first and second voltage means to produce magnetic fields having frequencies dependent upon the frequency of the voltage from the first and second means and rotatable relative to each other in a second direction opposite to the first direction and at a speed dependent upon the frequency of the magnetic fields and below the frequency of the voltage from the first means.

17. A variable speed drive assembly as set forth in claim 16 in which the first and second motive means are mechanically coupled and in which the first motive means is rotatable at a speed above the frequency of the first alternating voltage by an amount directly related to the frequency of the second alternating voltage and in which the first motive means is rotatable at a speed below the frequency of the first alternating voltage by an amount directly related to the frequency of the second alternating voltage.

18. A variable speed drive assembly, including, first motive means including first and second members rotatable with respect to each other and constructed to produce magnetic flux in accordance with their relative rotation, second motive means including first and second members rotatable with respect to each other and constructed to produce magnetic flux in accordance with their relative rotation, means for introducing a first alternating voltage to the second members in the first and second motive means to obtain a movement of the members in the motive means, means for introducing a second alternating voltage having a variable frequency to the first members in the first and second motive means to obtain a variation in the movement of the first member in the first motive means relative to the second member in the second motive means, and means for mechanically coupling the second members in the first and second motive means to obtain a transfer of mechanical energy from the first motive means to the second motive means in accordance with the production of flux in the first motive means by the first and second alternating voltages and to obtain a transfer of electrical energy from the second motive means to the first voltage means and to the first motive means in accordance with the production of flux in the second motive means by the first and second alternating voltages.

19. A variable speed drive assembly, including, first motive means including first and second members movable relative to each other and having magnetic properties for the transfer of slip energy between the members in accordance with the relative movement between the members and having the first member serve as an output member for rotation at a speed dependent upon the amount of slip energy transferred, second motive means including first and second members movable relative to each other and having magnetic properties for the transfer of slip energy between the members in accordance with the relative movement between the members, means for mechanically coupling the second member in the first motive means and the first member in the second motive means to obtain a dependent rotation of the members, means for providing a first alternating voltage and for introducing the alternating voltage to the second member in the first motive means and to the first member in the second motive means to obtain a mechanical transfer of slip energy from the first motive means to the second motive means and to obtain an electrical transfer of slip energy from the second motive means to the voltage means and the first motive means, and means for providing a second alternating voltage having variable frequency characteristics and for introducing the alternating voltage to the first member in the first motive means and to the second member in the second motive means to control the transfer of slip energy between the members in the motive means and to control the speed of rotation of the first member in the first motive means.

20. A variable speed drive assembly as set forth in claim 19 in which the first and second members in the first motive means have a relative rotation opposite to the relative rotation between the first and second members in the second motive means and in which the second member in the second motive means is stationary and in which the frequency of the second alternating voltage is variable through a particular range from substantially zero cycles per second.

21. A variable speed drive assembly, including, first motive means including first and second members movable relative to each other and having magnetic properties for the transfer of slip energy between the members in accordance with the relative movement between the members and having the first member serve as an output member for movement at a speed dependent upon the amount of slip energy transferred, second motive means including first and second members movable relative to each other and having magnetic properties for the transfer of slip energy between the members in accordance with the relative movement between the members, means for providing a first alternating voltage having adjustable characteristics and for introducing the voltage to the first member in the first motive means and to the second member in the second motive means to control the amount of slip energy transferred between the first and second members in the first motive means and the amount of slip energy transferred between the first and second members in the second motive means and to obtain the operation of the first motive means as an alternator, means for providing a second alternating voltage having particular characteristics and for introducing the voltage to the second member in the first motive means at a particular power intensity independent of the transfer of slip energy and for providing an electrical coupling between the voltage means and the first member in the second motive means to obtain a transfer of slip energy in electrical form from the first member in the second motive means to the voltage means and to the second member in the first motive means for use as output energy in the first member in the first motive means, the first member in the second motive means being mechanically coupled to the second member in the first motive means to obtain the conversion of slip energy in mechanical form from the first motive means to slip energy in electrical form from the second motive means and to obtain a counter-movement of the second motive means with respect to the first motive means.

22. A variable speed drive assembly, including, first motive means including first and second members movable in a first direction relative to each other, second motive means including first and second members movable in a second direction opposite to the first direction relative to each other, means for providing for the introduction of a first alternating voltage having a first particular frequency to the second member in the first motive means and to the first member in the second motive means to provide power for the operation of the first motive means in driving the second motive means as an alternator, and means for providing for the introduction of a second alternating voltage having a variable frequency to the first member in the first motive means and to the second member in the second motive means to control the relative movement between the members in the first motive means and between the members in the second motive means in accordance with the frequency of the second alternating voltage, the second member in the first motive means being mechanically coupled to the first member to obtain a relative motion of the second motive means in an opposite direction to the relative motion of the first motive means and to obtain the transfer of electrical energy from the second motive means to the first voltage means and the first motive means for maintaining the introduction of electrical energy from the first voltage means to the first motive means at a constant level regardless of the relative motion between the members in the first motive means.

23. The assembly set forth in claim 13 in which a first plurality of magnetic poles is coupled to the first motive means and in which a second plurality of magnetic poles is coupled to the second motive means and in which the difference in speed between the first and second motive means is directly related to the frequency of the second alternating voltage and is inversely related to the numbers of magnetic poles in the first and second pluralities.

24. The assembly set forth in claim 14, including a first plurality of magnetic poles coupled to the first and second members in the first motive means and in which a second plurality of poles is coupled to the first and second members in the second motive means and in which the difference in the speeds of the first and second motive means is equal to twice the second alternating frequency divided by the members of poles in the first and second pluralities.

25. The assembly set forth in claim 19 in which a first plurality of magnetic poles is coupled to the first and second members of the first motive means and in which a second plurality of magnetic poles is coupled to the first and second members of the second motive means and in which the amount of slip energy transferred from the first motive means to the second motive means is directly proportional to the frequency of the second alternating voltage and inversely proportional to the number of poles in the first and second pluralities.

No references cited.

UNITED STATES PATENT OFFICE
CERTIFICATE OF CORRECTION

Patent No. 2,896,143                          July 21, 1959

Andrew Bekey

It is hereby certified that error appears in the printed specification of the above numbered patent requiring correction and that the said Letters Patent should read as corrected below.

Column 20, line 16, for "members" read -- numbers --.

Signed and sealed this 1st day of March 1960.

(SEAL)
Attest:

KARL H. AXLINE                                    ROBERT C. WATSON
Attesting Officer                                Commissioner of Patents